US006352410B1

(12) United States Patent
Müller

(10) Patent No.: US 6,352,410 B1
(45) Date of Patent: Mar. 5, 2002

(54) VARIABLE-PITCH BOAT PROPELLER WITH EASY-CHANGE VANES

(75) Inventor: Peter Müller, Adliswil (CH)

(73) Assignee: NASYC Holding S.A., Luxembourg (LU)

( * ) Notice: Subject to any disclaimer, the term of this patent is extended or adjusted under 35 U.S.C. 154(b) by 0 days.

(21) Appl. No.: 09/632,659

(22) Filed: Aug. 4, 2000

(30) Foreign Application Priority Data

Aug. 5, 1999 (DE) ........................................ 199 36 948

(51) Int. Cl.[7] ........................... B63H 1/20; B64C 11/06
(52) U.S. Cl. .................................... 416/207; 416/245 A
(58) Field of Search ............................ 416/207, 245 A, 416/244 B, 90 A, 204 R

(56) References Cited

U.S. PATENT DOCUMENTS 5,554,003 A * 9/1996 Hall ........................... 416/140

FOREIGN PATENT DOCUMENTS

EP 0589338 3/1994

* cited by examiner

*Primary Examiner*—Edward K. Look
*Assistant Examiner*—Kimya McCoy
(74) *Attorney, Agent, or Firm*—Herbert Dubno; Andrew Wilford

(57) ABSTRACT

A variable-pitch boat propeller has a hub centered on and rotatable about a hub axis and formed with a radially out-wardly open pocket having a predetermined inside diameter and centered on a vane axis extending generally radially of the hub axis and a mounting plate rotatable in the pocket about the vane axis and having an outer face. A ring fixed in the pocket and having inner and outer peripheries bears radially inward of the hub axis on the mounting plate. An inner seal is provided between the inner ring periphery and the plate and an outer seal between the outer ring periphery and the pocket. A vane extending along the vane axis has a base of an outside diameter smaller than the inside diameter of the pocket and fitting in the pocket on the face of the plate. A screw or the like releasably secures the vane base to the plate face, and mechanism pivots the plate in the pocket about the vane axis.

7 Claims, 1 Drawing Sheet

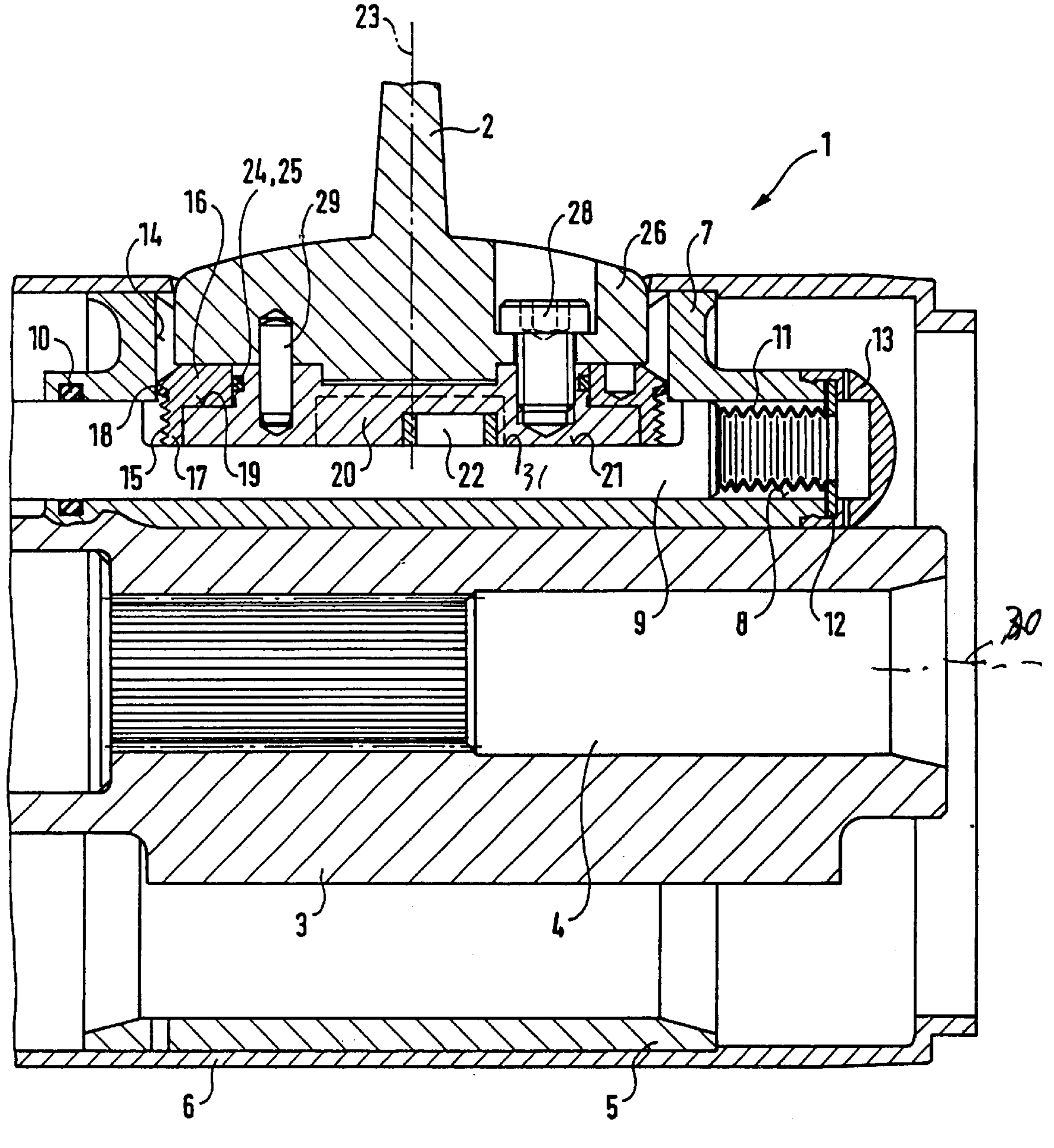
23
2
1
24,25
16
29
28
14
26
7
10
11
13
18
15
17
19
20
22
31
21
9
8
12
30
3
4
6
5

VARIABLE-PITCH BOAT PROPELLER WITH EASY-CHANGE VANES

FIELD OF THE INVENTION

The present invention relates to a boat propeller. More particularly this invention concerns such a propeller specifically designed so that its vanes can be replaced in the field.

BACKGROUND OF THE INVENTION

A standard variable-pitch propeller has a hub centered on and rotatable about a hub axis and formed with a plurality of radially outwardly open pockets each having a predetermined inside diameter and each centered on a respective vane axis extending generally radially of the hub axis. A mounting plate rotatable in the pocket about the vane axis is held therein by a ring fixed in the pocket. A vane extending along the vane axis has a base fitting in the pocket on the face of the plate. Pivoting of the plate about the respective vane axis pivots the vane to change the propeller pitch.

The vanes are pivoted by respective jointly axially displaceable rods that are exposed in the pockets and sealed to both sides of the pockets. Eccentric formations on the plates engage the rods so that, when same are shifted axially, the plates turn about the respective vane axes.

The bases of the vanes are normally secured by one or more screws to the respective plates so that they can, if necessary, be removed and replaced. Each vane base is provided with a seal ring that bears on the inner surface of the respective pocket so that water cannot enter the interior of the hub.

If a vane gets damaged, for instance by hitting the bottom or an object in the water, it must be replaced. The boat must be at least partially lifted out of the water, as once the vane is removed the interior of the hub is completely open, and it cannot be allowed to fill with water. When the hub is replaced the new seal must be meticulously installed to prevent leakage.

Even with the most care, the vane seals fail occasionally, in particular since they are deformed as the propeller pitch changes. Thus periodic failure and exposure of the interior of the hub to water is likely.

OBJECTS OF THE INVENTION

It is therefore an object of the present invention to provide an improved variable-pitch boat propeller.

Another object is the provision of such an improved variable-pitch boat propeller which overcomes the above-given disadvantages, that is whose vanes can be easily replaced, even under water, and where the likelihood of leakage into the hub is largely eliminated.

SUMMARY OF THE INVENTION

A variable-pitch boat propeller has according to the invention a hub centered on and rotatable about a hub axis and formed with a radially outwardly open pocket having a predetermined inside diameter and centered on a vane axis extending generally radially of the hub axis and a mounting plate rotatable in the pocket about the vane axis and having an outer face. A ring fixed in the pocket and having inner and outer peripheries bears radially inward of the hub axis on the mounting plate. An inner seal is provided between the inner ring periphery and the plate and an outer seal between the outer ring periphery and the pocket. A vane extending along the vane axis has a base of an outside diameter smaller than the inside diameter of the pocket and fitting in the pocket on the face of the plate. A screw or the like releasably secures the vane base to the plate face, and mechanism pivots the plate in the pocket about the vane axis.

Thus with this system the sealing is not done between the vane base and the hub pocket, but between the ring holding the plate in place and, on the outside, the pocket and, on the inside, the plate. This ring is normally installed in the factory or is only dealt with by professionals, normally in dry dock, so that its seals can be counted on to be installed perfectly and work without problems. The vane can, however, be unbolted and replaced by anyone with tools, even under water, with no likelihood of compromising the seals.

The pocket according to the invention is cylindrically stepped and centered on the vane axis. The ring has a flange engaging radially inward of the vane axis and overreaching an outer edge of the plate. Normally the inner portion of the stepped pocket is threaded so that the ring, which is externally threaded, can be screwed solidly into place.

The seal in accordance with the invention is between the flange and the plate and bears radially of the vane axis on the flange and the plate. The pocket has a floor and the ring has an axial flange bearing around the plate on the floor. The ring is of L-section and the seals are O-rings.

BRIEF DESCRIPTION OF THE DRAWING

The above and other objects, features and advantages will become more readily apparent from the following description, reference being made to the accompanying drawing whose sole figure is an axial section through a boat propeller according to the invention.

SPECIFIC DESCRIPTION

As seen in the drawing a boat propeller has a hub 1 rotatable about a normally horizontal axis 30, carrying three vanes 2 (only one shown), and comprising a tube shaft 3 having a central bore 4 fitted over the output shaft of the boat's engine. The shaft 3 also carries a support ring 5 in turn carrying a cylindrical jacket 6, both also centered on the axis 30 and fixed to the shaft 3 for joint rotation therewith.

The ring 6 in turn supports a cast-metal housing 7 formed with three axially extending passages 8 (only one shown) receiving respective jointly axially displaceable setting rods 9. O-ring seals 10 are provided at the front end of the housing 7 around each rod 9 and the rear end of each rod 9 is connected to the front end of an accordion-type seal 11 having a flange 12 sealed around the rear end of the respective passage 8 by a cap 13. As is known these rods 9 are moved axially jointly to set the pitch of the vanes 2.

The housing 7 is formed at each vane 2 with a stepped, cylindrical, and radially outwardly open pocket 14 centered on a vane axis 23 and formed at a small-diameter inner region with an internal screwthread 15. An L-section ring 16, 17 threaded into the pocket 14 and bearing radially inward of the axis 30 on a shoulder of a plate 20 carries the vane 2. This ring 16, 17 is of L-section with, relative to a vane axis 23, a radially inwardly projecting flange 16 and an axially extending flange 17. It is sealed at the flange 17 with respect to the pocket 14 by means of an O-ring seal 18 and at the flange 16 with respect to the plate 20 by another O-ring seal 24 set in a groove 25 of the plate 20. Thus the interior of the hub 1 is sealed by these rings 18 and 24.

The flange 17 sits on a floor 21 of the pocket 14, which is coplanar with a notch 31 cut in the respective rod 9. As is standard, an eccentric pin 22 mounted on the rod 9 engages in a slot in the plate 20 so that, as the respective rod 9 moves parallel to the axis 30, the vane 2 will be rotated about its axis 23, changing its pitch.

According to the invention the vane 2 is mounted on a foot or base 26 that is of basically cylindrical shape and smaller diameter than the mouth of the pocket 14. A pin 29 and at least one bolt 28 secure the vane 2 to the plate 20. Since the plate 20 is sealed with respect to the pocket 14 by the seals 18 and 24, there is no need to provide a seal between the vane base 26 and the hub 1.

To change a damaged vane, it is merely necessary to remove the screw(s) 28 and pull off the part 2 and 26. Then a new vane is fitted in place and secured by means of the screw(s) 28. As this operation does not open up any seals, no delicate internal parts are exposed so it is possible to change a vane even under water.

I claim:

1. A variable-pitch boat propeller comprising:

a hub centered on and rotatable about a hub axis and formed with a radially outwardly open pocket having a predetermined inside diameter and centered on a vane axis extending generally radially of the hub axis;

a mounting plate rotatable in the pocket about the vane axis and having an outer face;

a ring fixed in the pocket, having inner and outer peripheries, and bearing radially inward of the hub axis on the mounting plate;

an inner seal between the inner ring periphery and the plate;

an outer seal between the outer ring periphery and the pocket;

a vane extending along the vane axis and having a base of an outside diameter smaller than the inside diameter of the pocket and fitting in the pocket on the face of the plate;

means releasably securing the vane base to the plate face; and means for pivoting the plate in the pocket about the vane axis.

2. The variable-pitch boat propeller defined in claim 1 wherein the pocket is cylindrically stepped and centered on the vane axis, the ring having a flange engaging radially inward of the vane axis and overreaching an outer edge of the plate.

3. The variable-pitch boat propeller defined in claim 2 wherein the seal is between the flange and the plate and bears radially of the vane axis on the flange and the plate.

4. The variable-pitch boat propeller defined in claim 1 wherein the pocket has a threaded inner region and the ring is threaded to the pocket at the inner region.

5. The variable-pitch boat propeller defined in claim 4 wherein the pocket has a floor and the ring has an axial flange bearing around the plate on the floor.

6. The variable-pitch boat propeller defined in claim 1 wherein the ring is of L-section.

7. The variable-pitch boat propeller defined in claim 1 wherein the seals are O-rings.

* * * * *